United States Patent
Mehrl

(10) Patent No.: US 7,149,027 B2
(45) Date of Patent: Dec. 12, 2006

(54) DIGITAL MICROMIRROR DEVICE WITH SIMPLIFIED DRIVE ELECTRONICS FOR USE AS TEMPORAL LIGHT MODULATOR

(75) Inventor: David J. Mehrl, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/778,740

(22) Filed: Feb. 13, 2004

(65) Prior Publication Data

US 2004/0169910 A1 Sep. 2, 2004

Related U.S. Application Data

(62) Division of application No. 10/331,813, filed on Dec. 30, 2002.

(51) Int. Cl.
*G02B 26/00* (2006.01)

(52) U.S. Cl. .................. 359/290; 359/291; 359/298

(58) Field of Classification Search ............ 359/233–4, 359/290–92, 298, 310–11; 345/84–5, 108, 345/30, 55
See application file for complete search history.

(56) References Cited

U.S. PATENT DOCUMENTS 5,526,172 A * 6/1996 Kanack ...................... 359/291
6,337,760 B1 * 1/2002 Huibers et al. ............. 359/291
6,690,502 B1 * 2/2004 Huibers ...................... 359/291
6,816,640 B1 * 11/2004 Tew ............................. 385/18
2004/0100679 A1 * 5/2004 Kuo ............................ 359/291

OTHER PUBLICATIONS

U.S. Appl. No. 10/230,756, filed Aug. 29, 2002, Mehrl et al.
M. Storrs and D. J. Mehrl, Detection of Spatial Derivatives of Images Using Spatiotemporal Techniques, Optical Engineering, Sep. 1994, vol. 33, No. 9, pp. 3072-3081.
A. Korpel, D. J. Mehrl and S. Samson, Beam Profiling by Vibrating Knife Edge: Implications for Near-Field Optical Scanning Microscopy, International Journal of Imaging Systems and Technology, 1990, vol. 2, John Wiley & Sons, Inc., pp. 203-208.

* cited by examiner

*Primary Examiner*—Jordan Schwartz
*Assistant Examiner*—Jessica Stultz
(74) *Attorney, Agent, or Firm*—Charles A. Brill; Wade James Brady, III; Frederick J. Telecky, Jr.

(57) ABSTRACT

A digital micromirror device (DMD) modified for use as a temporal light modulator. The DMD is modified so that the mirrors of the DMD have a preferential tilt direction. The inputs and outputs of the DMD are connected to common ground, except for the bias input lines. The latter are connected to a common excitation input, which is used to cyclically reposition the mirrors between tilted and flat states.

13 Claims, 5 Drawing Sheets

DIGITAL MICROMIRROR DEVICE WITH SIMPLIFIED DRIVE ELECTRONICS FOR USE AS TEMPORAL LIGHT MODULATOR

This application is a Divisional of application Ser. No. 10/331,813, filed Dec. 30, 2002.

TECHNICAL FIELD OF THE INVENTION

This invention relates to digital micromirror devices, and more particularly to a method of using a digital micromirror device as a temporal light modulator.

BACKGROUND OF THE INVENTION

A Digital Micromirror Device™ (DMD™) is a type of microelectromechanical systems (MEMS) device. Invented in the 1980's at Texas Instruments Incorporated, the DMD is a fast, reflective digital light switch.

The DMD has a variety of applications, such as imaging systems and optical switching. For imaging systems, the DMD is combined with image processing, memory, a light source, and optics to form a digital light processing system capable of projecting large, bright, high-contrast color images.

DMD's may have a variety of designs, and the most popular design in current use is a structure consisting of a mirror that is rigidly connected to an underlying yoke. The yoke in turn is connected by two thin, mechanically compliant torsion hinges to support posts that are attached to the underlying substrate. Electrostatic fields developed between the underlying memory cell and the yoke and mirror cause rotation in the positive or negative rotation direction.

The fabrication of the above-described DMD structure begins with a completed CMOS memory circuit. Through the use of successive photomask layers, the structure is formed with alternating layers of metal for the address electrode, hinge, yoke, and mirror layers. Hardened photoresist forms sacrificial layers that are eventually removed to form air gaps.

Although a major application of DMDs is in the area of spatial modulation for projection displays, as stated above, other applications have been developed in many different fields of art. One possible application is the use of DMDs as temporal light modulators, for applications such as optical chopping for lasers or other optical intensity modulation. However, as configured for display applications, the drive electronics of the DMD are more complex than needed for this type of application.

SUMMARY OF THE INVENTION

One aspect of the invention is a digital micromirror device (DMD) modified for use as a temporal light modulator. The DMD has a two dimensional array of tiltable mirrors, as well as addressing circuitry underlying the array of mirrors and having a system of input and output connections, some of which are mirror bias lines. The mirrors have a preferential tilt direction, and the bias lines of the addressing circuitry have a single input connection for an excitation voltage with all other inputs and outputs connected to ground.

The simplified drive electronics results in a substantial reduction in the cost of operating the DMD. It also permits the use of marginally defective DMD devices that might otherwise be scrapped. DMDs modified for use as light modulators could not only be used for scientific equipment, but also for emerging applications such as for optical wireless links for home automation, home networking, and short range optical wireless modems.

DETAILED DESCRIPTION OF THE INVENTION

The following description is directed to two applications of the DMD as a temporal intensity modulator for a light source such as a laser. It should be understood that although the following description is directed to the DMD manufactured by Texas Instruments Incorporated, the same concepts could apply to other micromirror devices having mirror arrays and addressing circuitry that could be modified in the manner described herein.

A first application is as a chopper-type light modulator. For this application, the DMD is operated in a digital mode, in the sense that the mirrors cycle between a fully landed ("all on" or "all off") state and a flat state. For a second application, the DMD is operated in an analog mode, such as for optical equalizer or heterodyne applications. For this application, the mirrors are not landed. Rather, an analog voltage, whose magnitude is insufficient to land the mirrors, is applied so as to modulate the tilt angle of the mirror about a chosen operating point. For either application, the mirrors can be operated at fairly high frequencies (typically tens of kilohertz).

For the above-described applications, unlike other spatial modulation applications in which the DMD is used to generate images, the mirrors need not be individually addressed. All mirrors may tilt together in one direction or the other. This permits a simplification of the drive electronics for controlling the mirrors.

Figure 1:
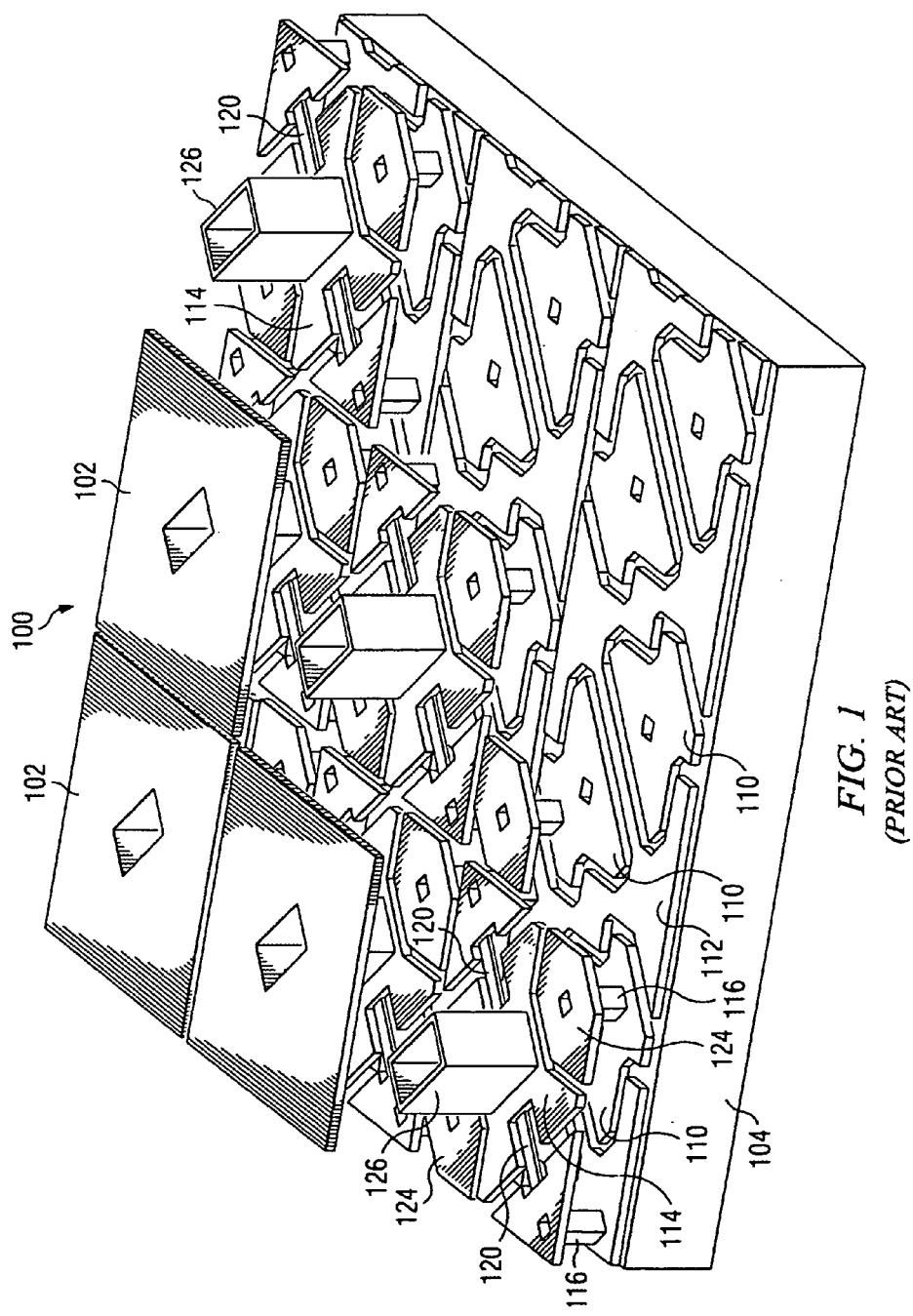
FIG. 1 is a top perspective view of a portion of a DMD.

FIG. 1 illustrates a portion (nine micromirror elements) of the mirror array of DMD 100. A DMD 100 typically has hundreds or thousands of rows and columns of micromirror elements. In FIG. 1, three of the nine micromirror elements have their mirrors 102 removed to show the underlying structure. Another three elements have had all of the structure removed except for an addressing layer.

Figure 2:
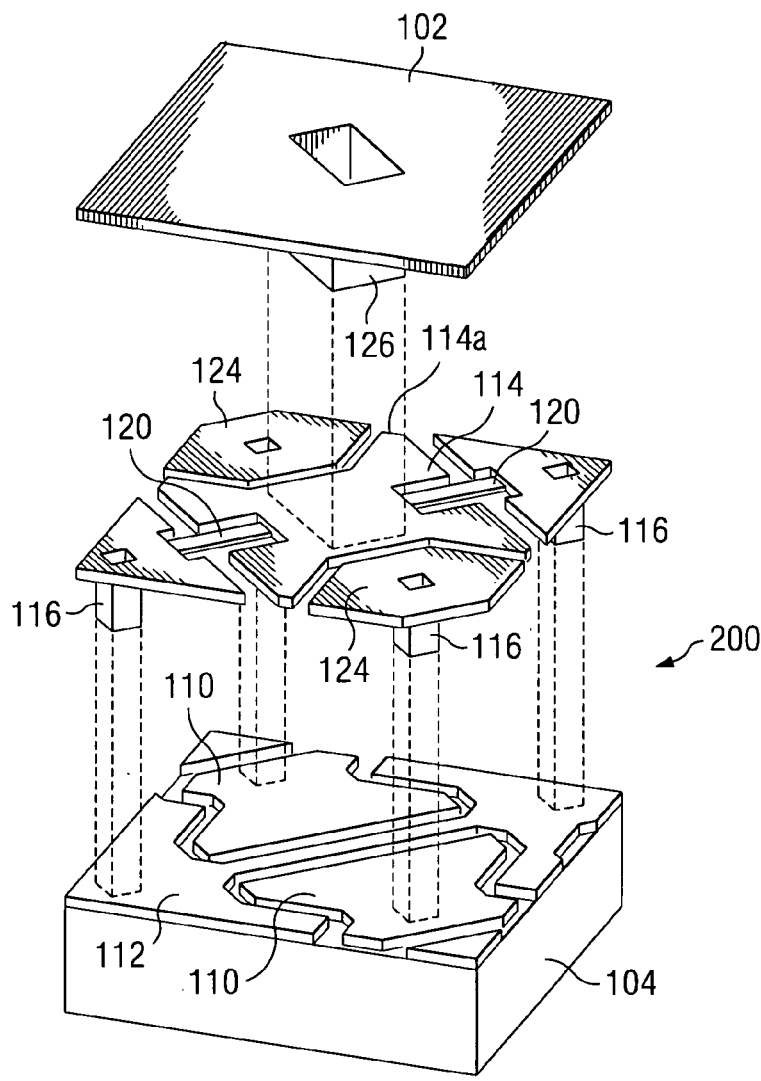
FIG. 2 is an exploded view of a single mirror element of the DMD of FIG. 1.

FIG. 2 is an exploded view of a DMD micromirror element 200. It illustrates how the various layers interrelate, including the underlying static random access memory (SRAM) cell 104, which is used to address the pixel.

Referring to both FIGS. 1 and 2, each DMD element 200 is a monolithically integrated MEMS superstructure cell fabricated over the SRAM cell 104. Two sacrificial layers have been removed by plasma etching to produce air gaps between three metal layers of the superstructure. For purposes of this description, the three metal layers are "spaced" apart by being separated by these air gaps.

The air gaps free certain parts of the structure to rotate about compliant torsion hinges 120.

The uppermost metal layer has a reflective mirror 102. The mirror 102 is connected, by means of support post 126, to an underlying yoke 114, which in turn is suspended by two thin torsion hinges 120 to support posts 116. When electrostatically activated, the mirror 102 and yoke 114 rotate until the landing tips 114a of yoke 114 come to rest against a landing surface. The landing surface limits the mirror rotation angle, such as to +10 or −10 degrees.

Address electrodes 110 and 124 are electrically connected to the underlying SRAM cell 104. The yoke 114 and mirror 102 are electrically connected to a bias/reset bus 112, which interconnects the mirrors 102 of all elements 200 to a bond pad at the chip perimeter.

As an example of the miniscule size of a typical DMD 100, the DMD mirrors 102 are each 16 um square and made of aluminum for maximum reflectivity. They are arrayed on 17 um centers to form a matrix having a high fill factor (~90%).

In operation, electrostatic fields are developed between the mirror 102 and yoke 114 and their underlying address electrodes 110, creating an efficient electrostatic torque. This torque works against the restoring torque of the hinge 120 to produce mirror rotation in the positive or negative direction.

Figure 3:
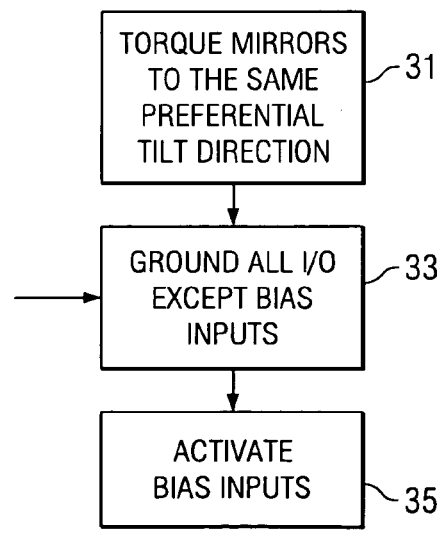
FIG. 3 illustrates a method of modifying a DMD for use as a temporal light modulator in accordance with the invention.

FIG. 3 illustrates a method of modifying a DMD 100 for temporal light modulator applications in accordance with the invention. As explained below, the method involves providing the mirrors 102 with a preferential tilt direction, in addition to simplifying the electrical drive system of the DMD 100.

Step 31 is providing all the mirrors 102 of the DMD 100 with the same "preferential tilt" in one direction or another. In the case of the DMD 100 illustrated in FIGS. 1 and 2, this means ensuring that all the mirrors prefer to tilt toward either the +1 (all on) or −1 (all off) direction.

Step 31 may be accomplished by writing a desired pattern to the memory cells underlying the mirror array of DMD 100 and electrostatically landing the mirrors in the desired tilt angle state. For example, all mirrors 102 can be landed to an "off" state. Next, the temperature of the DMD 100 is elevated for an extended period of time. Experimentation has shown that heating the DMD 100 to 100 degrees Centigrade for about eight hours works well.

After being torqued, the mirrors 102 will retain a slight, but permanent "preferential set" in tilt angle. This preference need only be sufficient to provide all the mirrors 102 with a slight preference to tilt in the desired direction. In operation, the mirrors 102 will move between the preferred landed tilt direction and the flat state. The "flat" state will actually now have a slight torque angle, but for purposes of this description, is still considered to be the flat state.

In Step 33, all inputs and outputs of DMD 100 are grounded, except for those connected to the bias/reset bus 112. This causes address electrodes 110 and 124 to assume a ground potential. The bias bus is given a common input. When sufficient potential is applied to the bias input, the mirrors will land in their predetermined state.

The simplified drive system precludes the need for sophisticated electronic control circuitry required for DMD image display applications. Nor are complicated reset pulses required to be generated and applied.

As indicated by Step 35, DMD 100 may now be operated by the application of a simple excitation voltage. As few as two wires, one for ground and one for the excitation input, are required to be connected to the DMD 100. The excitation input is via the common bias input. The address electrodes 110 and 124 are at ground potential, as distinguished from other DMD applications in which the address electrode for the on state is at a greater potential difference than for the off state. For DMD 100, because of the mirror torqueing, the mirrors 102 are attracted to their preferential tilting position, despite the fact that the address electrodes for either tilt direction are at the same ground potential.

In a "digital" mode, in which the DMD 100 is used like a chopper for on/off modulation, the mirrors 102 can be toggled between their flat state and their preferred landed state. Suitable switching voltages for digital applications are 0 and 24 volts.

In an "analog" mode, a smaller voltage is applied, one that is insufficient to land the mirrors 102. This voltage will progressively tilt the mirrors in the direction of their preferential state without landing them. The mirror tilt angles increase monotonically as the applied mirror bias increases. Varying amounts of light can be diffracted into the diffraction order chosen as the "output port" of the modulating device. By judiciously choosing the operating point (done by adjusting the DC bias part of the excitation signal), the intensity of the diffracted light can be continuously modulated in a highly linear fashion. A suitable range of voltages for analog applications is lower than that required for landing the mirrors. A typical range could from zero up to a value as high as 14 or so volts.

Figure 4:
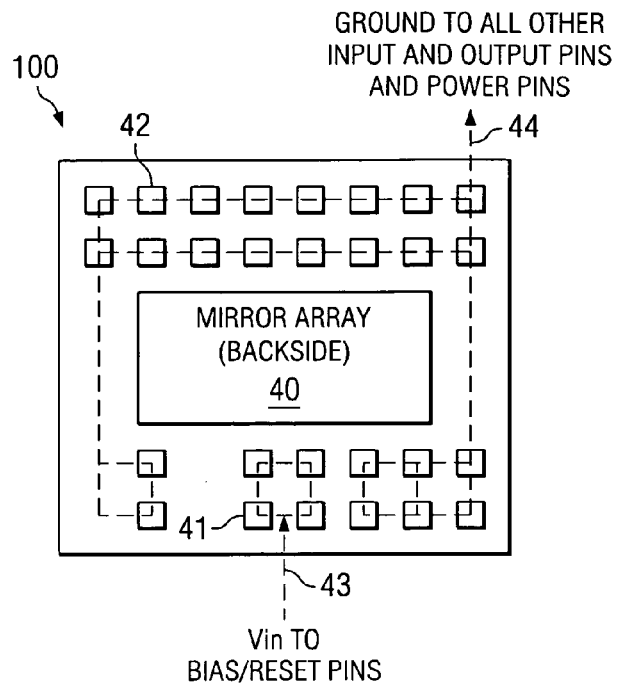
FIG. 4 is a bottom view of a DMD modified in accordance with the invention.

FIG. 4 illustrates the bottom of a DMD 100, modified in accordance with the invention. The mirror array 40 is surrounded by various input and output pins and other pads. To implement Step 33, all bias/reset pins (or pads), such as pad 41, are connected together and tied to a voltage input wire 43. All other inputs and outputs, such as pad 42, including the power supply connectors, are connected together and tied to a ground wire 44. As stated above, this includes grounding the pins associated with the address electrodes. A conductive ink pen may be used for this purpose.

Figure 5:
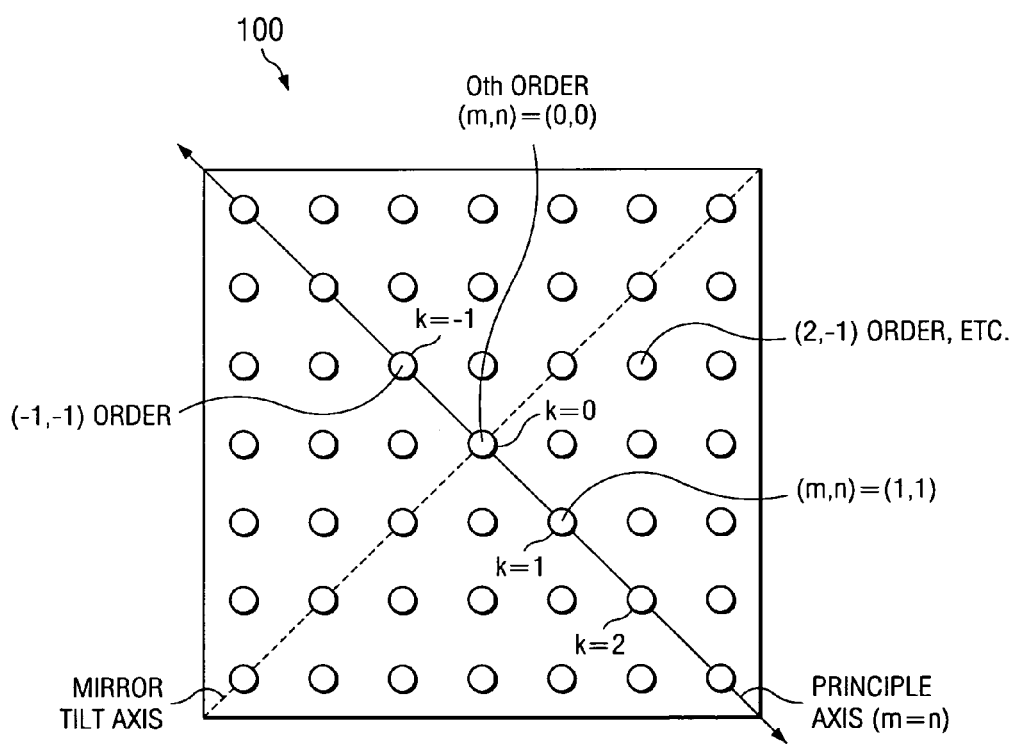
FIG. 5 illustrates the diffraction pattern geometry and diffraction orders of a DMD modified in accordance with the invention.

FIG. 5 illustrates the use of DMD 100, modified in accordance with the invention, as a controllable diffraction grating. FIG. 5 further illustrates the diffraction pattern geometry and definition of diffraction order indices. As indicated, the mirrors tilt along their diagonal axis.

When the tilt of the mirrors is controlled with an analog mirror bias voltage and the DMD 100 is illuminated with an incident laser, varying amounts of light can be diffracted. A particular diffraction order can then be passed through a screen that blocks all other orders, and the resulting beam becomes the output of an analog laser intensity modulator.

Mathematical theory can be applied to model and describe how mirror-bias-voltage-induced variations in mirror tilt angle can be used to modulate the intensity of various diffraction orders. In accordance with well known diffraction grating theory, maximal light is diffracting into a given order when the "blaze condition" is met. Because of the highly periodic nature of the DMD mirror array, many aspects of conventional "diffraction grating theory" can be applied to the DMD. E.g., it can be shown that maximal light is diffracted into the [−1, −1] order when the mirrors are tilted at an angle of alpha=−0.5 arcsin (1.414 lambda/T), where alpha is the mirror tilt angle (with a tilt angle of zero denoting a flat/untilted mirror), lambda is the wavelength of the laser light being modulated, and T is the periodic spacing (often called "mirror pitch") between adjacent mirrors on the DMD device. Now, as the mirror tilt angle is deviated from this ideal "blaze angle" (by changing the DC bias part of the DC+AC signal used for analog control of the mirror), the light intensity of this diffraction order will monotonically decrease. Changing the DC bias thus effectively allows one to choose an "operating point" for the signal. Now as the (time-varying) AC signal is injected, the light intensity will be linearly modulated (provided the amplitude of the AC signal is not too large) in accordance with the instantaneous amplitude of the time-varying AC signal. In practice, this operating point is typically chosen by (a) adjusting the DC bias until a particular order is "blazed", (b) then adding in a small AC signal component, then (c) adjusting the DC bias until the time-varying/AC component of the output optical signal is maximized. (The output signal is detected by placing a photodetector/PIN diode to detect the intensity of the [−1, −1] order). In this way the system is tuned to provide maximal gain, plus it can be shown that this operating point also generally provides the greatest linear dynamic range.

Experimentation with a DMD 100, modified in accordance with the invention, indicates that diffraction efficiency of up to 30% of incident laser light (red HeNe) into a [−1, −1] order may be accomplished. This 30% diffraction efficiency was measured with a silicon PIN photodetector.

Figure 6:
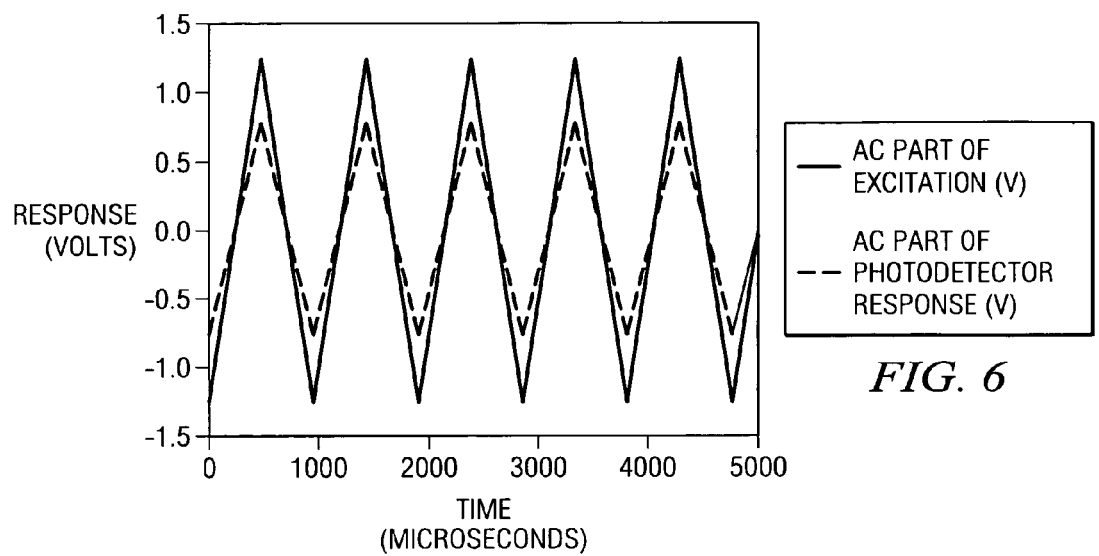
FIGS. 6–8 illustrate excitation voltages and modulated light response of the DMD light modulator.
Figure 7:
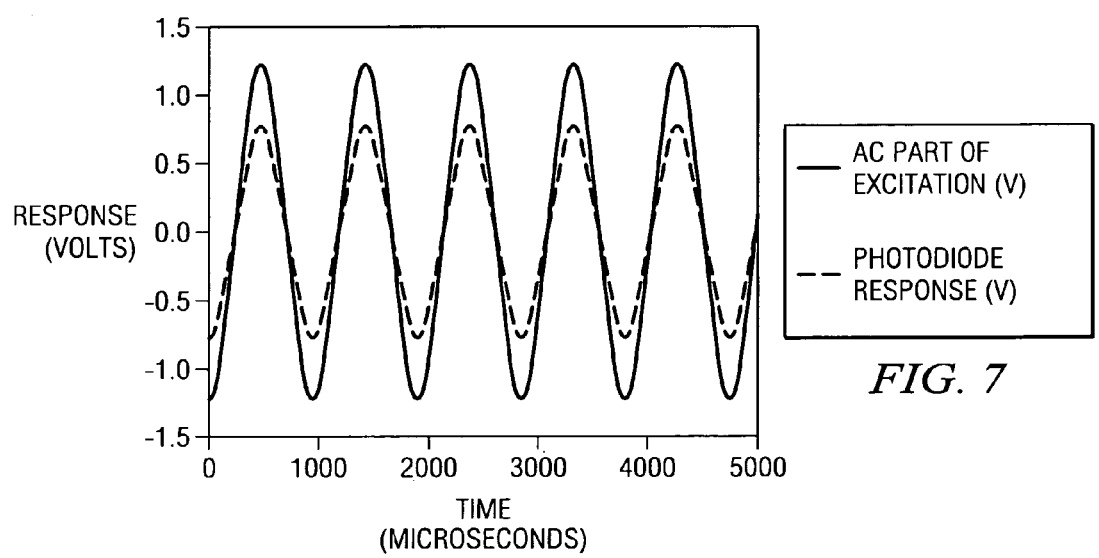
Figure 8:
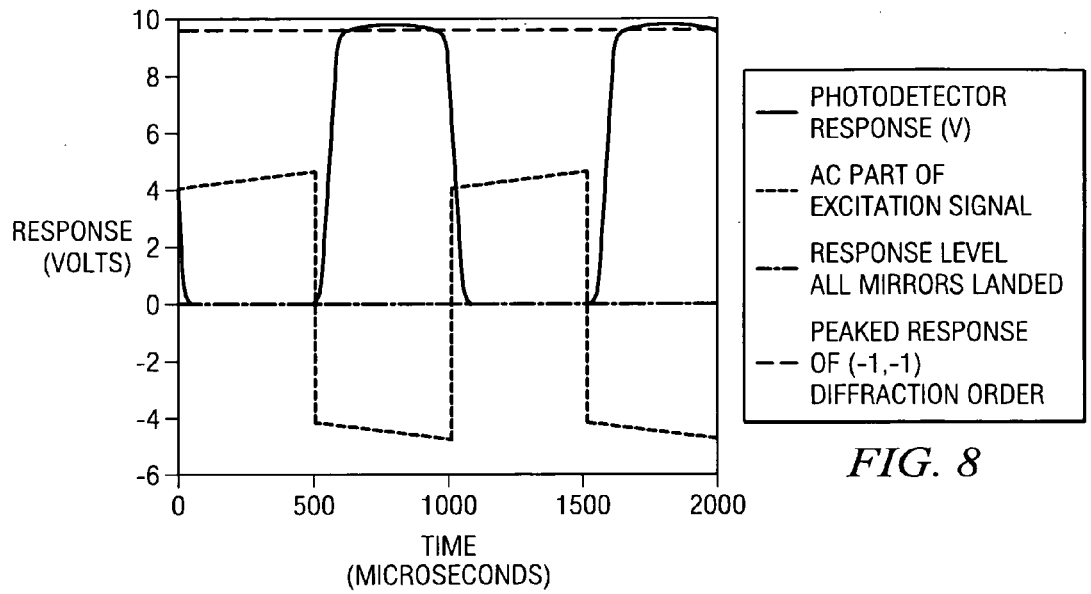

FIGS. 6, 7, and 8 each illustrate an excitation voltage waveform applied to the mirror bias input of DMD 100, as well as the response of diffracted light. The excitation voltages were in the form of triangular, sine, and square waves, respectively. The frequency was approximately 1 kHz. The DC bias to the mirror bias voltage was set at a DC level that maximizes the AC index of the desired diffraction order, here the [−1, −1] order. The desired AC waveform signal was added to the DC bias. The intensity of the laser light modulated into the selected order is modulated in a highly linear fashion.

Referring particularly to FIG. 8, a square wave excitation signal was applied, which has sufficient amplitude to land the mirrors. This "chops" the laser light on and off. In the experiment of FIG. 8, the peak diffraction efficiency was only 30%, which represents an optical insertion loss of 5 db. This was measured by measuring the peak light power diffracted into the [−1, −1] order and divided by the measured power of the incident laser beam. However, this 30% efficiency is not a significant limitation; for many applications, there is more than ample laser light power to begin with.

The laser modulation, as measured by a photodetector, follows the excitation waveform. Slight distortion in the figures results primarily from a crudely devised excitation input used for experimentation. In practice, a conventional operational-amplifier based summing circuit could be used to accurately sum a DC bias and AC signals.

As an example of further versatility of a DMD modified in accordance with the invention, Step 33 of FIG. 3 could be performed so as to torque portions of a DMD to different tilt directions. For example, one half of DMD 100 could be torqued to an "all on" state and the other to an "all off" state. Then, making the laser incident on the "all on" half would permit light to be diffracted into a [+n, +n] diffraction order, while making the laser incident on the "all off" half would permit light to be diffracted into the [−n, −n] diffraction order. In this sense, the DMD 100 would in effect, have two optical input ports and two optical output ports.

Conventional DMDs are manufactured with multiple reset zones, defined by separately connecting different portions of the mirror array to different bias/reset pads 112. For example, the device shown in FIG. 4 has eight separate individually controllable bias/reset inputs. This permits different control signals to be applied to different groups of mirrors. For light modulator applications, reset zones of DMD 100 could be grouped for two or more electrical control ports. In this way, the DMD device could have multiple output ports, each controlled by a unique control signal. It could also have multiple input ports, such as different colored lasers, as well controlled The frequency response characteristics of the DMD modulator 100 is determined by the dynamic response characteristics of the mirrors 102. The DMD modulator 100 works well at 1 kHz, which is a popular modulator frequency. For linear (small signal unlanded mirror operation) the frequency response curve of most DMDs is approximates a classic $2d$ order resonant curve with a resonant peak that typically lies in the range of 70–100 kHz, with a quality factor (Q) that typically varies from 4 to 6. This is a consequence of the "torsional spring mass" mechanical system determined by the moment of inertia of the mirror and the torsional mirror hinge. This means that linear modulation should work well, demonstrating a reasonably flat frequency response, with no modifications, at audio frequencies and above (i.e., from DC up to about 40 kHz). Beyond that, significant resonant peaking may occur. An equalization filter could be designed to be cascaded with the signal control input, which would attenuate signals about the mirror hinge resonance, so as to provide an essentially flat frequency response from DC to above 100 kHz.

Figure 9:
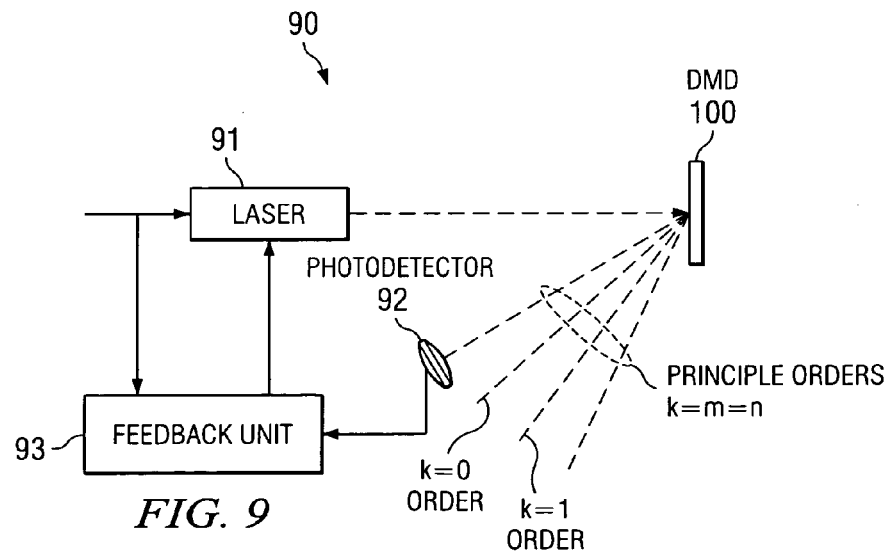
FIG. 9 illustrates a DMD temporal light modulation system.

FIG. 9 illustrates a light modulation system 90 using DMD 100. Some of the output light is delivered to a photodetector 92 and the resulting signal is used for closed loop feedback control. The feedback signal would be fed into a feedback circuit 93 that would compare the actual output light intensity to the desired control signal value, and adjust the applied mirror bias voltage accordingly. A standard PID type control scheme using an operational amplifier could be used. This would improve the linearity and usable linear dynamic range. System 90, with DMD 100 used as a laser intensity modulator with closed loop feedback, provides a high quality and low cost laser intensity stabilizer.

Other Embodiments

Although the present invention has been described in detail, it should be understood that various changes, substitutions, and alterations can be made hereto without departing from the spirit and scope of the invention as defined by the appended claims.

What is claimed is:

1. A method of modifying a digital micromirror device having mirror elements that are each operable to tilt in at least two directions responsive to electrostatic fields between the mirror element and its address electrodes, the mirror elements including at least a first plurality of mirror elements having a common bias bus, comprising the steps of:

providing each of the first plurality of mirror elements with a preferential tilt direction relative to a flat state, so that each of the first plurality of mirror elements tilts toward its preferential tilt direction responsive to an excitation voltage applied to the common bias bus relative to a reference voltage applied in common to the address electrodes of each of the first plurality of mirror elements; and connecting the common bias bus of the first plurality of mirror elements to at least one excitation voltage input line.

2. The method of claim 1, wherein the providing step provides all mirrors in the digital micromirror device with the same preferential tilt direction.

3. The method of claim 1, wherein the first plurality of mirror elements corresponds to one half of the mirror elements in the digital micromirror device;
   wherein each of the mirror elements is operable to tilt in an on direction and in an off direction responsive to electrostatic fields of first and second polarities, respectively, between the mirror element and its address electrodes;
   wherein the preferential tilt direction of the first plurality of mirror elements is in the on direction; and
   further comprising:
      providing a second plurality of mirror elements, corresponding to one half of the mirror elements in the digital micromirror device, with a preferential tilt direction in the off direction.

4. The method of claim 1, wherein the connecting step connects the common bias bus to a single excitation voltage input connection.

5. The method of claim 1, wherein the common bias bus is arranged in a plurality of reset groups having at least two different excitation voltage input connections.

6. A method of using a digital micromirror device, comprising the steps of:
   providing a micromirror device having mirror elements that are each operable to tilt in at least two directions responsive to electrostatic fields between the mirror element and its address electrodes, the mirror elements including at least a plurality of mirror elements that each have a bias node electrically connected in common with one another to a bias bus;
   setting a preferential tilt direction, relative to a flat state, for each of the plurality of mirror elements, so that each of the plurality of mirror elements tilt in its preferential tilt direction responsive to an excitation voltage applied to the bias bus relative to a reference voltage applied in common to the address electrodes of each of the plurality of mirror elements; and
   connecting the bias bus to at least one excitation input line.

7. The method of claim 6, further comprising:
   applying an excitation voltage to the excitation input line, in combination with applying a reference voltage in common to the address electrodes of each of the plurality of mirror elements, to place the plurality of mirror elements in a landed state in the preferential tilt direction.

8. The method of claim 6, further comprising:
   applying an excitation voltage to the excitation input line to tilt the plurality of mirror elements to an unlanded state in the preferential tilt direction.

9. The method of claim 6, further comprising the step of using the mirror elements to diffract light into a particular diffraction order.

10. The method of claim 6, wherein the excitation signal has an AC component and a DC bias component.

11. The method of claim 10, further comprising the steps of
   adjusting the operating point of the micromirror device by adjusting the excitation signal until a particular diffraction order is blazed,
   adding in the AC component, and
   adjusting DC bias until an output optical signal is maximized.

12. A method of modifying a digital micromirror device comprising mirror elements operable to tilt in at least two directions and a plurality of memory cells, each memory cell associated with and disposed near an associated mirror element, the mirror elements including at least a first plurality of mirror elements having a common bias bus;
   wherein each of the mirror elements includes an address line coupled to the memory cell, so that the mirror element is operable to tilt responsive to a state stored in its associated memory cell;
   providing the first plurality of mirror elements with a preferential tilt direction relative to a flat state, so that the first plurality of mirror elements tilt toward the preferential tilt direction responsive to a voltage applied to the common bias bus by:
      writing a memory state in each of the memory cells associated with the first plurality of mirror elements, the memory state tilting the first plurality of mirror elements in the preferential tilt direction; and
      heating the digital micromirror device; and
   connecting the common bias bus of the first plurality of mirror elements to at least one excitation voltage input line.

13. A method of using a digital micromirror device, comprising the steps of:
   providing a micromirror device comprising mirror elements operable to tilt in at least two directions, the mirror elements including at least a plurality of mirror elements that each have a bias node electrically connected in common with one another to a bias bus, and a plurality of memory cells, each memory cell associated with and disposed near an associated mirror element;
   wherein each of the mirror elements includes an address line coupled to the memory cell, so that the mirror element is operable to tilt responsive to a state stored in its associated memory cell;
   setting a preferential tilt direction, relative to a flat state, for the plurality of mirror elements, so that the plurality of mirror elements tilt in said preferential tilt direction responsive to a voltage applied to the bias bus, by:
      writing a memory state in each of the memory cells associated with the plurality of mirror elements, the memory state tilting the plurality of mirror elements in the preferential tilt direction; and
      heating the digital micromirror device; and connecting the bias bus to at least one excitation input line.

* * * * *